United States Patent [19]

DeBoer et al.

[11] Patent Number: 5,576,267
[45] Date of Patent: Nov. 19, 1996

[54] METHOD OF MAKING A COLOR FILTER ARRAY ELEMENT

[75] Inventors: Charles D. DeBoer, Palmyra; Werner N. Fassler, Rochester, both of N.Y.

[73] Assignee: Eastman Kodak Company, Rochester, N.Y.

[21] Appl. No.: 633,283

[22] Filed: Apr. 16, 1996

[51] Int. Cl.$^6$ .......................... B41M 5/035; B41M 5/38; G02B 5/22
[52] U.S. Cl. ................... 503/227; 156/659.11; 428/195; 428/210; 428/412; 428/913; 428/914; 430/5; 430/7; 430/200; 430/201; 430/320; 430/325; 359/885
[58] Field of Search ........................... 8/471; 156/659.11; 350/311; 428/195, 210, 412, 913, 914; 430/5, 7, 200, 201, 320, 323, 325; 503/227

[56] References Cited

U.S. PATENT DOCUMENTS

| | | | |
|---|---|---|---|
| 4,081,277 | 3/1978 | Brault et al. | 96/38 |
| 4,923,860 | 5/1990 | Simons | 503/227 |
| 4,962,081 | 10/1990 | Harrison et al. | 503/227 |
| 5,079,214 | 1/1992 | Long et al. | 503/227 |

*Primary Examiner*—B. Hamilton Hess
*Attorney, Agent, or Firm*—Harold E. Cole

[57] ABSTRACT

A method of preparing a color filter array element comprising the following steps:

a) coating a glass support with a polymeric dye image-receiving layer;

b) coating the polymeric dye image-receiving layer with at least one additive primary color dye from a solvent that does not swell or penetrate the polymeric dye image-receiving layer;

c) placing a stencil mask of a desired pixel shape in intimate contact with the surface of the polymeric dye image-receiving layer;

d) fusing the dye into the polymeric dye image-receiving layer by heating or by using a solvent vapor treatment using a solvent which will swell or penetrate the dye image-receiving layer;

e) removing the stencil mask;

f) removing all unfused dye with a solvent wash; and g) repeating steps b) to f) twice using different additive primary color dyes.

7 Claims, No Drawings

METHOD OF MAKING A COLOR FILTER ARRAY ELEMENT

This invention relates to a method of making a color filter array element which is temperature-resistant and fade-resistant.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals, which are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

Liquid crystal display devices are known for digital display in electronic calculators, clocks, household appliances, audio equipment, etc. Liquid crystal displays are being developed to replace cathode ray tube technology for display terminals. Liquid crystal displays occupy a smaller volume than cathode ray tube devices with the same screen area. In addition, liquid crystal display devices usually have lower power requirements than corresponding cathode ray tube devices.

There has been a need to incorporate a color display capability into such monochrome display devices, particularly in such applications as peripheral terminals using various kinds of equipment involving phototube display, mounted electronic display, or TV-image display. Various attempts have been made to incorporate a color display using a color filter array element into these devices. However, none of the color array elements for liquid crystal display devices so far proposed have been successful in meeting all the users' needs.

One commercially available type of color filter array element that has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. Further details of this process are disclosed in U.S. Pat. No. 4,081,277.

Color liquid crystal display devices generally include two spaced glass panels which define a sealed cavity that is filled with a liquid crystal material. For actively-driven devices, a transparent electrode is formed on one of the glass panels, which electrode may be patterned or not, while individually addressable electrodes are formed on the other of the glass panels. Each of the individual electrodes has a surface area corresponding to the area of one picture element or pixel. If the device is to have color capability, each pixel must be aligned with a color area, e.g., red, green or blue, of a color filter array. Depending upon the image to be displayed, one or more of the pixel electrodes is energized during display operation to allow full light, no light or partial light to be transmitted through the color filter area associated with that pixel. The image perceived by a user is a blending of colors formed by the transmission of light through adjacent color filter areas.

In forming such a liquid crystal display device, the color filter array element to be used therein may have to undergo rather severe heating and treatment steps during manufacture. For example, a transparent conducting layer, such as indium tin oxide (ITO), is usually vacuum sputtered onto the color filter array element which is then cured and patterned by etching. The curing may take place at temperatures as high as 200° C. for times which may be as long as one hour or more. This is followed by coating with a thin polymeric alignment layer for the liquid crystals, such as a polyimide, followed by another curing step for up to several hours at an elevated temperature. These treatment steps can be very harmful to many color filter array elements, especially those with a gelatin matrix using the prior art technique described above.

Polycarbonate dye image-receiving layer materials for color filter array elements are described in U.S. Pat. No. 4,962,081. In using these materials to form a color filter array element, the polymeric material is typically coated on a glass support, using spin coating in order to obtain a smooth coating. Alternatively, the dye image-receiving layer can be applied to the support in a pattern, just slightly larger than the viewing area of the liquid crystal display device, by means of screen printing, as disclosed in U.S. Pat. No. 5,079,214.

U.S. Pat. No. 4,923,860 discloses that the dyes which color each pixel of a color filter array can be thermally transferred by means of a patterned flash of light onto a dye-donor sheet held in close contact with a polycarbonate receiving layer coated on a glass support. However, there is a problem with this manufacturing method because the finite thickness of the dye-donor sheet support used causes some blurring and rounding of the edges of the transferred dye spots. If the blurring is too extensive, it can lead to mixing of some of the color from one pixel to the next, with concomitant loss of color purity. Because of this, the support for the dye-donor sheet must be as thin as possible, which in turn makes it fragile and difficult to handle without creasing.

As described above, a useful color filter array should have good thermal resistance so that subsequent high-temperature processing steps, such as vacuum sputtering of conductive layers and curing of polymeric alignment layers will not degrade the color quality of the pixels making up the array. The dyes which color the pixels of the array should also be chosen to have good fade resistance to the viewing light which illuminates them. These dyes must have good color purity, and the overall transmissivity of the color filter array should be as high as possible, consistent with good color quality and saturation, so that the power of the illuminating source need not be excessively high. Additional requirements for a high-quality color filter array are that resolution be high so that images appear sharp and detailed to the eye and that overall image uniformity be good.

It is an object of this invention to provide a method for making color filter arrays which would not involve the need for using fragile dye-donor sheets from which dyes are transferred into a polymeric receiving layer, and which would still provide formation of temperature- and fade-resistant, sharp pixels in such an array.

The present invention provides a method of preparing a color filter array element comprising the following steps:

a) coating a glass support with a polymeric dye image-receiving layer;

b) coating the polymeric dye image-receiving layer with at least one additive primary color dye from a solvent that does not swell or penetrate the polymeric dye image-receiving layer;

c) placing a stencil mask of a desired pixel shape in intimate contact with the surface of the polymeric dye image-receiving layer;

d) fusing the dye into the polymeric dye image-receiving layer by heating or by using a solvent vapor treatment using a solvent which will swell or penetrate the dye image-receiving layer;

e) removing the stencil mask;

f) removing all unfused dye with a solvent wash; and g) repeating steps b) to f) twice using different additive primary color dyes.

When the above steps b) to f) are repeated using other additive primary color dyes, the patterned stencil mask is obviously offset in order to produce the colors in a different image pattern. The resulting pixels in the color filter array prepared by the process of the invention excel in sharpness, well-defined edges, high color purity, and saturation. The resulting color filter array is also heat- and fade-resistant.

Another embodiment of the invention relates to a method of preparing a color filter array element comprising the following steps:

I) coating a glass support with a polymeric dye image-receiving layer;

II) coating said polymeric dye image-receiving layer with at least one additive primary color dye from a solvent that does not swell or penetrate said polymeric dye image-receiving layer;

III) fusing said dye into said polymeric dye image-receiving layer by irridiating with a focused, modulated laser beam to cause dye to penetrate into said dye image-receiving layer in accordance with the modulation pattern;

IV) removing all unfused dye with a solvent wash; and

V) repeating steps II to IV twice using different additive primary color dyes.

A prefatory step to the pattern-wise fusing of the dye into the polymeric dye image-receiving layer is to coat or otherwise distribute the unfused dye onto the surface of the dye image-receiving layer. Various methods may be employed to place the dye onto the surface of the dye image-receiving layer. A powder of the solid dye may be sprinkled or dusted onto the surface or the dye may be evaporated onto the surface in a vacuum deposition apparatus.

A preferred method to lay down the dye is by spin coating the dye from a solvent such as water that does not swell or dissolve the polymeric dye image-receiving layer. For example, a very fine dispersion or emulsion of hydrophobic dye particles in water can be used to spin coat the dye onto a hydrophobic polymeric dye image-receiving layer.

The process of the invention provides a dye image-receiving layer which contains a thermally transferred image comprising a repeating pattern of colorants, preferably in a mosaic pattern.

In a preferred embodiment of the invention, the mosaic pattern consists of a set of red, green and blue additive primaries.

In another preferred embodiment of the invention, each area of primary color and each set of primary colors are separated from each other by an opaque area, e.g., black grid lines. This has been found to give improved color reproduction and reduce flare in the displayed image.

The size of the mosaic set is not critical since it depends on the viewing distance. In general, the individual pixels of the set are from about 50 to about 600 mm and do not have to be of the same size.

In a preferred embodiment of the invention, the repeating mosaic pattern of dye to form the color filter array element consists of uniform, square, linear repeating areas, with one color diagonal displacement as follows:

RGBRG

BRGBR

GBRGB

In another preferred embodiment, the above squares are approximately 100 mm.

The color filter array elements prepared according to the invention can be used in image sensors or in various electro-optical devices such as electroscopic light valves or liquid crystal display devices. Such liquid crystal display devices are described, for example, in UK Patents 2,154,355; 2,130,781; 2,162,674 and 2,161,971.

Liquid crystal display devices are commonly made by placing a material, which is liquid crystalline at the operating temperature of the device, between two transparent electrodes, usually indium tin oxide coated on a substrate such as glass, and exciting the device by applying a voltage across the electrodes. Alignment layers are provided over the transparent electrode layers on both substrates and are treated to orient the liquid crystal molecules in order to introduce a twist of, e.g., 90°, between the substrates. Thus, the plane of polarization of plane polarized light will be rotated in a 90° angle as it passes through the twisted liquid crystal composition from one surface of the cell to the other surface. Application of an electric field between the selected electrodes of the cell causes the twist of the liquid crystal composition to be temporarily removed in the portion of the cell between the selected electrodes. By use of optical polarizers on each side of the cell, polarized light can be passed through the cell or extinguished, depending on whether or not an electric field is applied.

The polymeric alignment layer described above can be any of the materials commonly used in the liquid crystal art. Examples of such materials include polyimides, polyvinyl alcohol and methyl cellulose.

The transparent conducting layer described above is also conventional in the liquid crystal art. Examples of such materials include indium tin oxide, indium oxide, tin oxide and cadmium stannate.

The dye image-receiving layer used in forming the color filter array element of the invention may comprise, for example, those polymers described in U.S. Pat. Nos. 4,695,286, 4,740,797 and 4,775,657, and 4,962,081, the disclosures of which are hereby incorporated by reference. In a preferred embodiment, polycarbonates having a glass transition temperature greater than about 200° C. are employed. In another preferred embodiment, polycarbonates derived from a methylene-substituted bisphenol A such as 4,4'-(hexahydro-4,7-methanoindan-5-ylidene)-bisphenol are employed. In general, good results have been obtained at a coverage of from about 0.25 to about 5 mg/m$^2$.

The support used in the invention is glass such as borax glass, borosilicate glass, chromium glass, crown glass, flint glass, lime glass, potash glass, silica-flint glass, soda glass, and zinc-crown glass. In a preferred embodiment, borosilicate glass is employed.

Various dyes or mixture of dyes can be used in the process of the invention. Especially good results have been obtained with the following dyes:

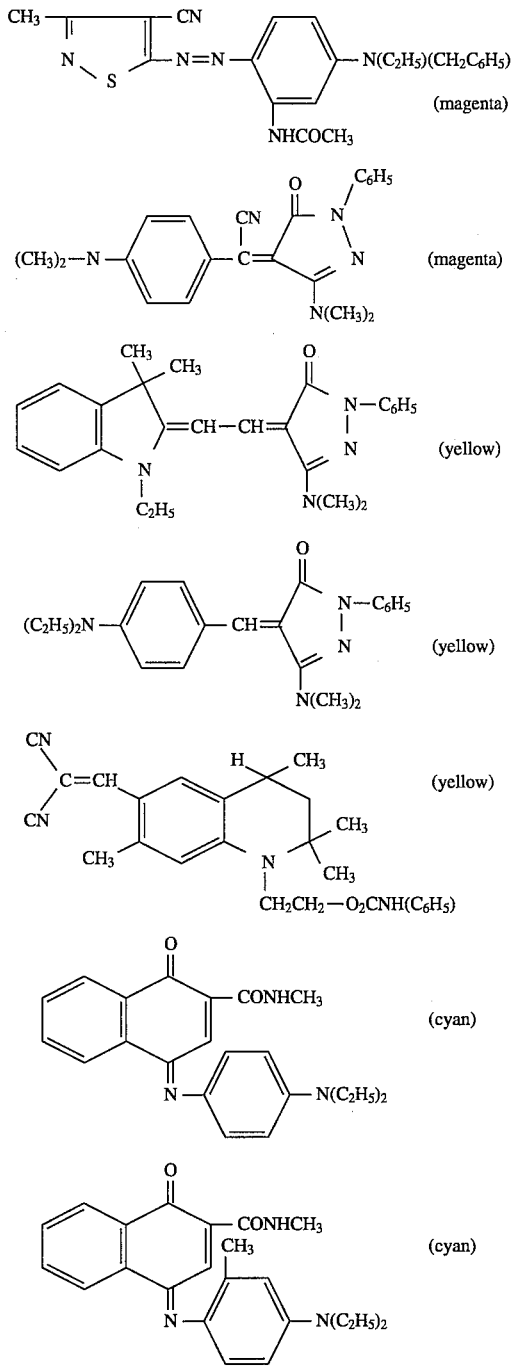

or any of the dyes disclosed in U.S. Pat. No. 4,541,830, the disclosure of which is hereby incorporated by reference. The above dyes may be employed singly or in combination to obtain a monochrome.

The above subtractive dyes can be employed in various combinations to obtain the desired red, blue and green additive primary colors, as disclosed in U.S. Pat. Nos. 4,957,898, 4,975,410, and 4,988,665, the disclosures of which are hereby incorporated by reference. The dyes can be mixed within the dye layer or transferred sequentially if coated in separate dye layers and can be used at a coverage of from about 0.05 to about 1 g/m².

Various methods can be used to fuse dye into the polymeric dye image-receiving layer on the support to form the color filter array element. For example, a stencil mask, with fine holes corresponding to the desired color array pixels, may be placed over the polymeric dye image-receiving layer. If the stencil is made of a metal such as iron or nickel, it can be held in good contact with the dye image-receiving layer by means of a magnet placed behind the support. Such an assembly may then be exposed to a solvent vapor which will swell and soften the polymeric dye image-receiving layer through the holes in the stencil, thereby effecting a pattern of the stencil.

Instead of using an external metal stencil, an in situ stencil may be prepared by means of coating the dye image-receiving layer with a water-based photoresist, such as dichromated gelatin. The pattern of holes in the resist may then be prepared by exposure to a pattern of ultra-violet radiation that will crosslink the resist. The unexposed resist can then be washed off, leaving areas of the dye image-receiving layer polymer into which the dye can be fused by means of the solvent vapor described above.

Another way to effect imagewise fusing of the dye into the dye image-receiving layer is by using heating such as a thermal resistive head as described in U.S. Pat. No. 4,621,271, the disclosure of which is hereby incorporated by reference.

Another kind of heating is the use of an array of metal prongs, or needles, having the dimensions and spacing of the desired pixel elements of the colorfilter array. Fusing the dye into the dye image-receiving layer may be accomplished by placing a heated array of needles into contact with the dye layer coated on the dye image-receiving layer for sufficient time to allow the heat to fuse the dye into the dye image-receiving layer.

Yet another way to effect the fusing of the dye into the dye image-receiving layer is by heating through irradiation of the pixel element with an intense beam of radiation absorbed by either or both the dye and the polymeric dye image-receiving layer. A convenient way of supplying the radiation is by flash discharge of an electrically charged capacitor through an argon-filled quartz tube. Such flash lamp tubes are widely employed as electronic photographic flash bulbs and, in larger sizes, as illuminating flash lamps for airport runways.

The following examples are provided to illustrate the invention:

Example 1

A small square of glass (approximately 5 cm on a side) was spin coated at 200 rev/min with a 10% solution of 4,4'-(hexahydro-4,7-methanoindan-5-ylidene)bisphenol polycarbonate in toluene and allowed to dry while spinning. This was overcoated by spinning at 1000 rev/min with a saturated solution of the above cyan dye in ethanol. When dry, two pennies were placed on the surface of the dye, and the assembly was placed in a fusing chamber saturated with toluene vapor. After 5 minutes, the assembly was removed from the chamber and the unfused dye was removed by washing with ethanol, leaving two clear areas where the pennies were in contact with the dye layer surrounded by fused cyan dye. This shows that the technique of the basic steps of the invention is feasible.

Example 2

Another square of glass was prepared in the same way as in Example 1, but the fusing was effected by touching the surface of the dye layer with a soldering iron tip heated to 450° F. for 2 seconds. The layer was then washed with ethanol, leaving a small, sharply defined spot of cyan dye where the soldering iron tip had contacted the dye image-receiving layer. This again shows that the technique of the basic steps of the invention is feasible.

Example 3—In situ method

Another square of glass was prepared in the same way as in Example 1, and was then overcoated with a solution of 5% poly(vinyl alcohol) and 1% ammonium dichromate in water by spinning at 100 rev/min. When dry, the plate was covered with a photographic mask pattern of small holes, and the assembly was exposed to a high intensity UV lamp for 60 seconds. Then the resist image was developed by spinning with water to remove the unexposed resist. The developed image was dried and then overcoated by spinning with a solution of the above cyan dye in ethanol.

When dry, the image was placed in a chamber filled with anisole vapor for 10 minutes and then baked in an oven at 133° F. for 10 minutes. The plate was then washed with ethanol on the spinner and the resist removed by rubbing under hot water. The result was a clear image of blue dots corresponding to the photographic mask pattern.

This shows the feasibility of the invention using the in-situ preparation of the mask.

Example 4—Patterned Fusing by Laser Heat

A 5 cm square of soda lime glass was overcoated by spinning (2000 rev/min) with a 5% solution of Butvar B76® (Monsanto Co.) polymer in methyl isobutyl ketone as a dye image-receiving layer. When dry, the dye image-receiving layer was overcoated with a dispersion of the first cyan dye illustrated above in water by spinning at 2000 rev/min for 2 minutes. The coated glass was placed on the exposure platen of a diode laser scanning devise described in U.S. Pat. No. 5,017,547, hereby incorporated by reference.

The 50 mW (37 mW on the exposure plane) beam (7×9 micron oval at half power) was swept across the exposure plane at 165 mm per second, and the power of laser was modulated between full power and threshold power in accordance with a pattern stored on a computer magnetic disk. After exposure, the sample was washed with water and lightly scrubbed with a cotton swab. A photomicrograph of the resulting image showed sharp, well defined, high contrast pixel elements 200×300 microns in size, with 50 micron clear gaps between the pixels.

Example 5—Patterned Fusing by Masked Radiant Heat

The coated glass of Example 4 was covered by a metal mask with 5 mm holes in it and the assembly was placed beneath an infrared source (Model 5610 from Research Inc., Minneapolis, Minn.) at a distance of 15 cm for 4 minutes. Then the unfused cyan dye was removed by washing with water leaving a high contrast image of fused cyan dye corresponding to the holes in the mask.

Example 6—Patterned Fusing by a Heated Metal—Three Colors

The coated glass of Example 4 was placed on a 0.95 cm thick aluminum block that had 0.32 cm channels cut in it to a depth of 0.32 cm in orthogonal directions, thus generating an array of 0.16 cm square posts on 0.32 cm centers. The aluminum block was placed on a hot plate held at 220° C. and allowed to equilibrate before the coated glass was placed on the aluminum. The coated side of the glass was in contact with the aluminum posts.

The glass was allowed to remain in contact with the hot aluminum posts for about 1 second, then removed and washed with water to reveal a high contrast image of the aluminum post pattern.

The glass was then overcoated with a dispersion of the first magenta dye illustrated above (12%) in water by spinning at 5000 rev/min for 1 minute. The coated glass was placed on the heated aluminum post block for about 1 second, removed and washed with water to reveal the second color pattern.

The glass was then coated with the third yellow illustrated above (12% in water), and the heating was repeated to give the third color pattern.

Example 7—Patterned Fusing by Masked Solvent Vapor

The coated glass of Example 4 was placed on an aluminum plate (0.64 cm thick) which had 4 holes drilled in it (0.64 cm diameter). The aluminum plate was placed over a well of methylene chloride for 10 seconds.

Then the unfused cyan dye was washed off the plate with water, leaving a high contrast image of cyan dye where the holes in the aluminum plate allowed the methylene chloride vapor to fuse the dye into the dye image-receiving layer.

The invention has been described in detail with particular reference to preferred embodiments thereof, but it will be understood that variations and modifications can be effected within the spirit and scope of the invention.

We claim:

1. A method of preparing a color filter array element comprising the following steps:
    a) coating a glass support with a polymeric dye image-receiving layer;
    b) coating said polymeric dye image-receiving layer with at least one additive primary color dye from a solvent that does not swell or penetrate said polymeric dye image-receiving layer;
    c) placing a stencil mask of a desired pixel shape in intimate contact with the surface of said polymeric dye image-receiving layer;
    d) fusing the dye into said polymeric dye image-receiving layer by heating or by using a solvent vapor treatment using a solvent which will swell or penetrate said dye image-receiving layer;
    e) removing said stencil mask;
    f) removing all unfused dye with a solvent wash; and
    g) repeating steps b) to f) twice using different additive primary color dyes.

2. The process of claim 1 further comprising coating a transparent conducting layer over said color filter array element and a polymeric alignment layer over said conducting layer.

3. The process of claim 1 wherein said polymeric dye image-receiving layer comprises a polycarbonate having a glass transition temperature greater than about 200° C.

4. The process of claim 3 wherein said polycarbonate is derived from 4,4'-(hexahydro-4,7-methanoindan-5-ylidene)bisphenol.

5. The process of claim 1 wherein said stencil masks produce a mosaic pattern of a set of red, green and blue primary colors.

6. The process of claim 1 wherein said step c) is performed using an in situ stencil prepared by coating a water-based photoresist onto said dye image-receiving layer, forming a pattern of holes in said photoresist by exposure to a pattern of ultra-violet radiation that will crosslink said photoresist, and washing off the unexposed photoresist.

7. A method of preparing a color filter array element comprising the following steps:

I) coating a glass support with a polymeric dye image-receiving layer;

II) coating said polymeric dye image-receiving layer with at least one additive primary color dye from a solvent that does not swell or penetrate said polymeric dye image-receiving layer;

III) fusing said dye into said polymeric dye image-receiving layer by irridiating with a focused, modulated laser beam to cause dye to penetrate into said dye image-receiving layer in accordance with the modulation pattern;

IV) removing all unfused dye with a solvent wash; and

V) repeating steps II to IV twice using different additive primary color dyes.

* * * * *